United States Patent
Van Der Meulen

(12) 
(10) Patent No.: US 6,273,975 B1
(45) Date of Patent: Aug. 14, 2001

(54) METHOD FOR PRODUCING A METAL STRIP AND DEVICE FOR REDUCING THE RISK OF SUCH A STRIP BREAKING

(75) Inventor: Frits Van Der Meulen, IJmuiden (NL)

(73) Assignee: Corus Technology B.V., IJmuiden (NL)

( * ) Notice: Subject to any disclaimer, the term of this patent is extended or adjusted under 35 U.S.C. 154(b) by 0 days.

(21) Appl. No.: 09/530,876

(22) PCT Filed: Nov. 12, 1998

(86) PCT No.: PCT/EP98/07333

§ 371 Date: Jun. 27, 2000

§ 102(e) Date: Jun. 27, 2000

(87) PCT Pub. No.: WO99/25500

PCT Pub. Date: May 27, 1999

(30) Foreign Application Priority Data

Nov. 19, 1997 (NL) .................................................. 1007582

(51) Int. Cl.[7] .................................. C21D 8/02; B26D 3/00
(52) U.S. Cl. ........................... 148/645; 148/508; 266/90; 266/99; 83/875; 83/880; 83/886; 83/917
(58) Field of Search .............................. 266/90, 99, 103; 83/875–887, 917; 148/645, 508

(56) References Cited

U.S. PATENT DOCUMENTS

| | | |
|---|---|---|
| 3,194,545 | 7/1965 | Smith . |
| 3,431,624 * | 3/1969 | Pickel .................................. 148/508 |
| 4,597,521 | 7/1986 | Wilson ................................. 228/160 |
| 4,773,949 * | 9/1988 | Yamaguchi et al. ................. 148/645 |

FOREIGN PATENT DOCUMENTS

| | | |
|---|---|---|
| 1815380 | 7/1970 | (DE) . |
| 3008342 | 9/1981 | (DE) . |
| 0556462 | 8/1993 | (EP) . |
| 59-115119 | 7/1984 | (JP) . |
| 61-142012 | 6/1986 | (JP) . |
| 05112810 | 5/1993 | (JP) . |
| 06262239 | 9/1994 | (JP) . |

* cited by examiner

*Primary Examiner*—Deborah Yee
(74) *Attorney, Agent, or Firm*—Stevens, Davis, Miller & Moshner, LLP

(57) ABSTRACT

A method for producing a metal strip which reduces the risk of the strip breaking over the course of a path, the strip being conveyed under stress in the strip direction and in which, in an upstream feed path of the metal strip, defects in the edges of the strip are detected and then measures are taken to reduce the risk of these defects causing the strip to break, in which method the strip is provided, in the region of the detected defect, with at least one notch in the strip direction, at a distance which is further away from the edge of the strip than the maximum dimension of the defect transversely with respect to the strip direction.

12 Claims, 1 Drawing Sheet

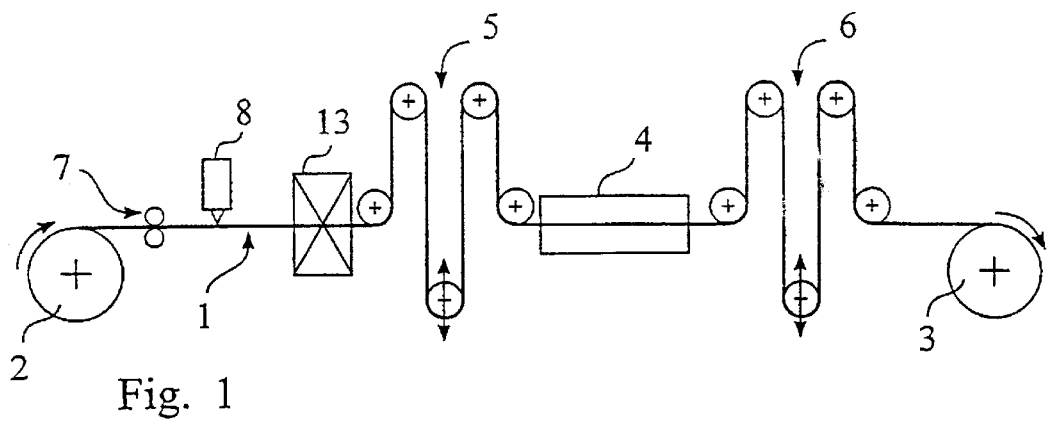
Fig. 1
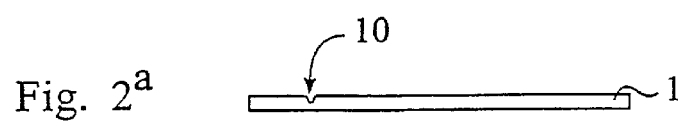
Fig. 2ª
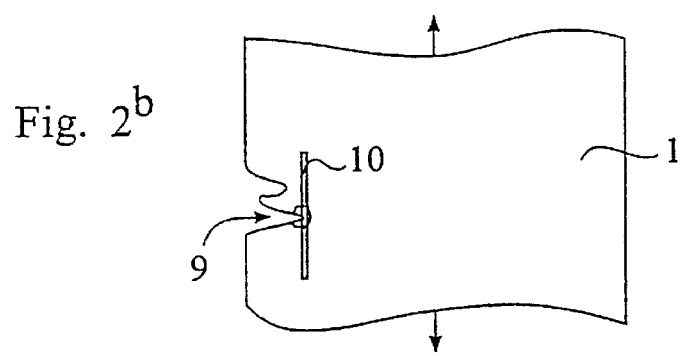
Fig. 2ᵇ
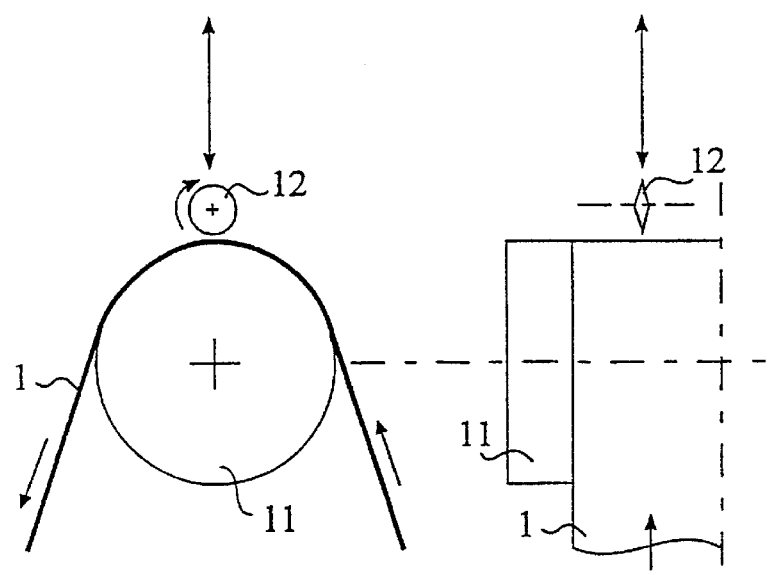
Fig. 3ª   Fig. 3ᵇ

METHOD FOR PRODUCING A METAL STRIP AND DEVICE FOR REDUCING THE RISK OF SUCH A STRIP BREAKING

FIELD OF THE INVENTION

The invention relates to a method for producing a metal strip which reduces the risk of the strip breaking over the course of a path, the strip being conveyed under stress in the strip direction and in which, in an upstream feed path of the strip, defects in the edges of the strip are detected and then measures are taken to reduce the risk of these defects causing the strip to break.

The invention also relates to a device for carrying out the novel method.

A method of the known type mentioned is used, for example, for treating a cold-rolled steel strip in a continuous annealing line, although the invention is not limited to this application.

When producing thin steel strip, as a rule the steel is successively subjected to what are known as hot and cold rolling treatments, in order to achieve the ultimate desired thickness of a few tenths of a millimetre. However, these treatments cause metallurgical changes in the steel which often make it less suitable for further processing.

BACKGROUND OF THE INVENTION

A conventional method of improving the processing properties consists in passing the strip through an annealing furnace under a certain tensile stress.

A known problem with this method consists in the fact that the preceding section of the production of the steel strip may cause defects in the edges of the strips, which defects may lead to the strip breaking in the furnace when it is under stress.

Continuous annealing furnaces are highly complicated installations which require a very considerable time to thread the strip through. If a strip breaks, this loss of time causes enormous production losses. It is therefore essential to limit the occasions when the strip breaks to an absolute minimum.

A conventional way of achieving this consists in detecting defects in the edge of the strip in the feed path of the metal strip which precedes the annealing section. An optoelectronic system is often used to do this, in which case a defect detected by a camera is translated into an electronic signal.

It should be noted that defects may comprise hairline cracks running from the edge of the strip, but also loose flaps at the edge or relatively coarse inclusions. Sudden changes in the width of the strip may sometimes also be regarded as defects. A defect causes a local increase in stresses in the strip if the latter is under stress. This increase in stresses may initiate a crack which results in the strip breaking.

The most simple measures which follow the detection of a defect consist in the movement of the strip being stopped and in a piece being removed from the edge of the strip at the location of the defect. Although such a measure prevents the strip from breaking, it nevertheless leads to a loss of production, while furthermore a piece of strip has been subjected to a different heat treatment, which may also lead to differences in quality of the annealed strip.

SUMMARY OF THE INVENTION

The object of the invention is therefore to avoid the occurrence of a strip breaking as a result of a defect without stopping the movement of the strip and without requiring very complicated measures. To this end, the invention consists in the fact that, in the known method mentioned, the strip is provided, in the region of a detected defect, with at least one notch in the strip direction, at a distance which is further away from the edge of the strip than the maximum dimension of the defect transversely with respect to the strip direction.

Forming a notch in the strip direction is considerably easier and less susceptible to speed limitations than removing a defect. The aim of the notch formed is to prevent any edge crack caused by a defect from being able to continue any further than the notch, so that this crack does not affect the rest of the strip and there is no longer any possibility of the strip breaking.

The effect of one notch can be improved by forming a second notch, while in the case of two notches the notch depth of each notch can be reduced. One possibility worth considering is that of forming two notches opposite one another on either side of the strip. The choice of one or more notches is dependent, inter alia, on the type of material of the metal strip and on the technical facilities provided by the installation employed.

The most simple way of forming a notch consists in holding a sharp pin against the strip. However, this operation may itself give rise to undesirable defects in the strip, so that according to the invention it has been found that preference is given to the use of one or more cutting wheels. A cutting wheel of this nature, having a sharp edge, presses the notch further into the material than the extent to which it is itself drawn into the latter. As a result, the edge of the notch becomes smoother and the formation of a burr is avoided.

Other ways of forming a notch are also conceivable, however, such as for example using a laser beam.

Obviously, a deep notch has the advantage that an edge crack which has formed is blocked more effectively than where a shallow notch is used. On the other hand, an excessively deep notch risks causing a longitudinal crack at the location of this notch, with possible adverse effects. According to the invention, it has been found that preference is given to a method in which the residual thickness of the metal strip at the location of the notch is between 10 and 40% of the strip thickness.

Since an edge crack initiated from a defect does not necessarily have to propagate precisely transversely to the strip direction, the notch must be sufficiently long. However, on the other hand, it is advantageous that the strip should not be damaged unnecessarily. It has been found that the best results are obtained if each notch extends, in the strip direction, upstream and downstream of the defect over a total length which is equal to the length of the defect measured in the strip direction +1 to 3 times the distance between the notch and the edge of the strip. Furthermore, the simplest solution is obtained by making the notch V-shaped with a vertex angle of less than 90°.

If, where a notch is present, a defect leads to an edge crack, it is conceivable that the latter will propagate through the notch. In that case, the result is a sudden change in strip width at the end of the notch, which could itself in turn give rise to a fresh edge crack. In order to prevent this, it has been found to be effective, according to the invention, for the notch depth to increase gradually, from the ends of the notch until it reaches its full depth, over a distance of between 2 and 20 times the strip thickness. In this way, an edge crack which propagates through the notch will come up against continuously thicker strip material before reaching the end of the notch.

It has already been noted above that the method is not limited to use on steel strips which are passed through an annealing furnace after they have been cold-rolled. It could also be used on metal strips of different compositions and also on metal strips which are passed through other treatment installations, such as a coating bath. Nevertheless, it has been found that the invention provides very good results in particular when used in the treatment of cold-rolled steel strip in a continuous annealing line.

As has been noted, the invention also relates to a device for reducing the risk of a strip breaking. This device may then be arranged in an installation comprising a feed system for a metal strip and a treatment system, in which the metal strip is held under stress, which device comprises, in the feed system, a detector for detecting defects in the edges of the moving metal strip. In this case, according to the invention, the novel device is furthermore provided with a system for forming at least one notch in the metal strip in the strip direction, which system furthermore comprises control means which can be used to control the location, depth and length of the notch on the basis of signals transmitted by the detector.

Furthermore, the novel device may be designed in such a way that it is suitable for carrying out the diverse variants of the method as described above.

BRIEF DESCRIPTION OF THE DRAWINGS

The invention will now be explained with reference to a number of figures which diagrammatically illustrate the use of the invention on a continuous annealing line for steel strip. In the drawing:

FIG. 1 shows a diagrammatic illustration of an annealing line;

FIG. 2a and FIG. 2b show a cross section and a top view of a piece of a steel strip;

FIG. 3a shows a detail of how a notch is formed, in cross section;

FIG. 3b shows a front view of this detail.

DETAILED DESCRIPTION OF THE PREFERRED EMBODIMENTS

In FIG. 1, reference numeral 1 denotes a cold-rolled steel strip which is unwound from a coiler 2 and, after it has been treated, is, wound onto a coiler 3. Reference numeral 4 diagrammatically depicts a continuous annealing furnace. Before entering the annealing furnace, strip 1 passes through an entry buffer 5, and after leaving the furnace it is passed through an exit buffer 6. Arrows diagrammatically indicate that the volume of strip in the entry buffer 5 and in the exit buffer 6 can be varied. This makes it possible to accommodate discontinuities in the course of the strip without the passage of the strip into the annealing furnace 4 becoming irregular. Such irregularities in the running of the strip may be caused if a new strip is being placed on coiler 2 and has to be welded to the old strip in a welding installation 7. In a similar way, a full coiler can be cut free from strip 1, after which the strip has to be guided onto a new coiler.

A detector 8 is positioned upstream of entry buffer 5. The detector 8 illustrated is positioned above one of the edges of the strip and is of a type which views a halogen illumination from below the strip by means of a camera which is positioned above the strip. The light received by the camera is detected and translated into a crack or some other defect. A device 13 for forming a notch in the strip is situated downstream of the detector in the strip direction. This device 13 is controlled by the signal transmitted by detector 8. Since this requires simple control engineering, the details of this control are not described further in the following text.

Since edge effects may occur in both edges of the strip, a detector 8 and a device 13 will generally be arranged on either side of the strip in the vicinity of both edges.

FIG. 2a shows a cross-sectional view of a steel strip 1. FIG. 2b shows a top view of the same strip 1.

In FIG. 2b, a defect 9 in the edge is shown, which defect is depicted as a sharply tapering notch. When the strip 1 is placed under stress (cf. the arrows in FIG. 2b), there is a real risk of this notch resulting in a continuous crack which may lead to the strip breaking. FIGS. 2a and 2b furthermore show a V-shaped notch 10. This notch is formed in the longitudinal direction of the strip and in the vicinity of the deepest point of defect 9. It has been found that a notch of this nature prevents a crack from being able to propagate transversely to the strip direction. In the case illustrated, the depth and length of the notch are indicated diagrammatically. In a situation which occurs in practice, these dimensions will satisfy the condition explained in the preceding text.

FIG. 3 shows a structure for forming the notch in strip 1, specifically in cross section in FIG. 3a and in front view in FIG. 3b.

Reference numeral 11 denotes a plastic-coated roll over which strip 1 is passed. FIG. 3b shows an edge defect 9 behind which a notch is to be formed in the strip. To do this, a cutting wheel 12 with a sharp V-shaped edge is positioned above the roll 11. Cutting wheel 12 can be moved up and down in the direction of the arrow, so that it can be moved off strip 1 but can also be pressed into the latter. Cutting wheel 12 is mounted so that it can rotate freely about an axle (not shown).

The location of the cutting wheel 12 in the axial direction of roll 11 can be varied as a function of the depth of the edge defect 9 detected. Naturally, the notch will be formed as close as possible to the deepest point of such a defect. Both the location of the cutting wheel and its depth are easy to control from detector 8 as a function of the presence and shape of the defect observed and detected. Since these are simple movements which are rapidly able to follow a signal received, it is even possible to form a notch without having to reduce the strip velocity.

Obviously, numerous variants on this design are conceivable, inter alia depending on whether a plurality of notches are desired in the strip. All these variants are obvious to the person skilled in the art and do not need to be explained further in order to be clearly understood.

What is claimed is:

1. A method for producing a metal strip which reduces the risk of the strip breaking over the course of a path, the strip being conveyed under stress in the strip direction and in which, in an upstream feed path of the metal strip, defects in the edges of the strip are detected and then measures are taken to reduce the risk of these defects causing the strip to break, wherein the strip is provided, in the region of a detected defect, with at least one notch in the strip direction, at a distance which is further away from the edge of the strip than the maximum dimension of the defect transversely with respect to the strip direction.

2. The method according to claim 1, wherein two notches are formed opposite one another on either side of the strip.

3. The method according to claim 1 or 2, wherein the notch or notches is (are) formed using a cutting wheel (cutting wheels).

4. The method according to claim 1, wherein the residual thickness of the metal strip at the location of the notch is between 10 and 40% of the strip thickness.

5. The method according to claim 1, wherein each notch extends upstream and downstream of the defect, in the strip direction, over a total length which is equal to the length of the defect measured in the strip direction +1 to 3 times the distance between the notch and the edge of the strip.

6. The method according to claim 1, wherein the notch is V-shaped, with a vertex angle of less than 90°.

7. The method according to claim 1, wherein the notch depth increases gradually, from the ends of the notch until it reaches its full depth, over a distance of between 2 and 20 times the strip thickness.

8. The method according to claim 1, wherein the method is used to treat cold-rolled steel strip in a continuous annealing line.

9. A device for reducing the risk of a strip breaking in an installation comprising a feed system for a metal strip (1) and a treatment system (4), in which the strip (1) is held under stress, which device comprises, in the feed system, a detector (8) for detecting defects in the edges of the moving strip, wherein a system (12) is also provided for forming at least one notch in the strip in the strip direction, which system furthermore comprises control means which can be used to control the location, depth and length of the notch on the basis of signals transmitted by the detector (8).

10. A device for producing a metal strip which reduces the risk of the strip breaking over the course of a path, the strip being conveyed under stress in the strip direction and in which, in an upstream feed path of the metal strip, defects in the edges of the strip are detected and then measures are taken to reduce the risk of these defects causing the strip to break, wherein the strip is provided, in the region of a detected defect, with at least one notch in the strip direction, at a distance which is further away from the edge of the strip than the maximum dimension of the defect transversely with respect to the strip direction, comprising:

a feed system for the metal strip (1), wherein the feed system comprises, a detector (8) for detecting defects in the edges of the moving strip, a treatment system (4) in which the strip (1) is held under stress, and a cutter system (12) for forming at least one notch in the strip in the strip direction is located downstream of the detector in the strip direction, the system comprising control means capable of controlling the location, depth and length of the notch on the basis of signals transmitted by the detector.

11. The device of claim 10, wherein the cutter system comprises a cutting wheel.

12. The device of claim 10, wherein the cutter system comprises a plastic coated roll (11) and a cutting wheel located adjacent the plastic coated roll, wherein the plastic coated roll (11) and the cutting wheel are located to pass the strip therebetween.

\* \* \* \* \*